(12) United States Patent
Yamamoto et al.

(10) Patent No.: US 10,625,594 B2
(45) Date of Patent: Apr. 21, 2020

(54) ELECTRIC VEHICLE DRIVE DEVICE

(71) Applicant: NSK LTD., Tokyo (JP)

(72) Inventors: Shin Yamamoto, Kanagawa (JP); Yasuyuki Matsuda, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/324,753

(22) PCT Filed: Feb. 16, 2018

(86) PCT No.: PCT/JP2018/000503
§ 371 (c)(1),
(2) Date: Feb. 11, 2019

(87) PCT Pub. No.: WO2018/151256
PCT Pub. Date: Aug. 23, 2018

(65) Prior Publication Data
US 2019/0168605 A1 Jun. 6, 2019

(30) Foreign Application Priority Data
Feb. 17, 2017 (JP) .................................. 2017-028192

(51) Int. Cl.
| | |
|---|---|
| *B60K 7/00* | (2006.01) |
| *B60K 17/04* | (2006.01) |
| *F16H 57/02* | (2012.01) |
| *H02K 7/00* | (2006.01) |
| *H02K 7/116* | (2006.01) |

(Continued)

(52) U.S. Cl.
CPC .............. *B60K 7/0007* (2013.01); *B60K 7/00* (2013.01); *B60K 17/046* (2013.01); *B60L 15/00* (2013.01); *F16H 3/728* (2013.01); *F16H 57/02* (2013.01); *H02K 7/006* (2013.01); *H02K 7/085* (2013.01); *H02K 7/116* (2013.01); *H02K 11/215* (2016.01); *B60K 2007/0038* (2013.01);
(Continued)

(58) Field of Classification Search
CPC ...... B60K 7/00; B60K 7/0007; B60K 17/046; B60K 2007/0038; B60K 2007/0092; F16H 3/728; F16H 57/02; F16H 2057/02034; H02K 7/006; H02K 7/116; H02K 7/085; H02K 11/215; B60L 7/00
See application file for complete search history.

(56) References Cited

U.S. PATENT DOCUMENTS

2013/0267365 A1* 10/2013 Gunji .................. B60K 7/0007
475/5

FOREIGN PATENT DOCUMENTS

| JP | 2007-057066 A | * | 3/2007 | ............... F16H 3/72 |
|---|---|---|---|---|
| JP | 2012-005169 A | | 1/2012 | |
| JP | 2013-044424 A | | 3/2013 | |

OTHER PUBLICATIONS

International Search Report for PCT/JP2018/005503 dated May 22, 2018 (PCT/ISA/210) (4 pages).

* cited by examiner

*Primary Examiner* — Mark J Beauchaine
(74) *Attorney, Agent, or Firm* — Sughrue Mion, PLLC

(57) ABSTRACT

An electric vehicle drive device includes: a first motor; a second motor, and a transmission mechanism coupled to the first motor and the second motor and capable of switching a reduction ratio. The transmission mechanism includes a sun gear shaft coupled to the first motor. The first motor includes: a first stator core, a first rotor core disposed
(Continued)

radially outward of the first stator core, and a first rotor holding member that couples the first rotor core and the sun gear shaft.

13 Claims, 11 Drawing Sheets

(51) Int. Cl.
*H02K 11/215* (2016.01)
*H02K 7/08* (2006.01)
*B60L 15/00* (2006.01)
*F16H 3/72* (2006.01)

(52) U.S. Cl.
CPC ............... *B60K 2007/0092* (2013.01); *F16H 2057/02034* (2013.01); *F16H 2200/0021* (2013.01); *Y02T 10/641* (2013.01)

ELECTRIC VEHICLE DRIVE DEVICE

CROSS REFERENCE TO RELATED APPLICATIONS

This application is a National Stage of International Application No. PCT/JP2018/005503 filed Feb. 16, 2018, claiming priority based on Japanese Patent Application No. 2017-028192, filed Feb. 17, 2017.

FIELD

The present invention relates to an electric vehicle drive device.

BACKGROUND

In electric vehicles such as electric cars, drive devices to be driven by power of batteries are mounted. Of the drive devices, in particular, a drive device for directly driving a wheel is called "in-wheel motor". The types of driving of the in-wheel motor include a gear reduction type provided with a reducing mechanism and a direct drive type not provided with a reducing mechanism. The in-wheel motor of the gear reduction type can easily output torque necessary when an electric vehicle starts and climbs (ascends a hill), but a friction loss occurs in the reducing mechanism. On the other hand, the in-wheel motor of the direct drive type can prevent the friction loss, but the torque that can be output is relatively small. When an electric vehicle starts or climbs, relatively large torque is necessary, but the traveling speed of the vehicle is relatively low. When the electric vehicle cruises on a flat road, on the other hand, necessary torque is small, but the traveling speed of the vehicle is relatively high. Thus, for example, Patent Literature 1 discloses an in-wheel motor including a transmission mechanism.

CITATION LIST

Patent Literature

Patent Literature 1: Japanese Patent Application Laid-open No. 2013-044424 A

SUMMARY

Technical Problem

To improve the ride quality of a vehicle, it is required to increase the stroke (maximum range of motion) of a shock absorber in a suspension. The in-wheel motor including the transmission mechanism as disclosed in Patent Literature 1 is likely to be upsized, and hence may interfere with a member constituting the suspension. Thus, an electric vehicle drive device capable of reducing the outer diameter of a case while being provided with the transmission mechanism has been sought after.

The present invention has been made in view of the above, and it is an object thereof to provide an electric vehicle drive device capable of changing speed and reducing the outer diameter of a case.

Solution to Problem

To achieve the above object, an electric vehicle drive device according to an embodiment of the present invention includes a first motor, a second motor, and a transmission mechanism coupled to the first motor and the second motor and capable of switching a reduction ratio. The transmission mechanism includes a sun gear shaft coupled to the first motor, and the first motor includes a first stator core, a first rotor core disposed radially outward of the first stator core, and a first rotor holding member that couples the first rotor core and the sun gear shaft.

Consequently, the electric vehicle drive device can change speed by including the first motor, the second motor, and the transmission mechanism. The first rotor core that rotates together with the sun gear shaft is disposed radially outward of the first stator core, and hence a dead space is less likely to occur in the first motor. Thus, the outer diameter of the case covering the first motor is reduced. Accordingly, the electric vehicle drive device can change speed and reduce the outer diameter of the case.

As a desirable embodiment, the electric vehicle drive device includes a case that supports the first motor, the second motor, and the transmission mechanism. The case includes a first motor holding unit having a cylindrical shape coaxial with the sun gear shaft, the first stator core is attached to an outer peripheral surface of the first motor holding unit, and the first rotor holding member is attached to an inner peripheral surface of the first motor holding unit through a bearing.

Consequently, as seen from the axial direction, the center of the first stator core and the rotation center of the first rotor holding member are easily aligned. Thus, the centering of the first stator core and the first rotor core can be easily achieved.

As a desirable embodiment, the electric vehicle drive device includes a case that supports the first motor, the second motor, and the transmission mechanism. The case includes a first motor holding unit having a cylindrical shape protruding from a surface opposed to an end surface of the first motor, and the case covers a part of a side surface of the first motor and the end surface of the first motor.

As a desirable embodiment of the electric vehicle drive device, the first stator core is a cylindrical member, and is attached to an outer peripheral surface of the first motor holding unit.

As a desirable embodiment of the electric vehicle drive device, the case is a cylindrical member, and includes a partition wall having an annular shape protruding from an inner wall.

As a desirable embodiment of the electric vehicle drive device, the first rotor core is positioned in an axial direction by a first positioning ring attached to the first rotor holding member.

As a desirable embodiment of the electric vehicle drive device, the first rotor holding member includes a first outer member and a first inner member located radially inward of the first outer member.

As a desirable embodiment, the electric vehicle drive device includes a case that supports the first motor, the second motor, and the transmission mechanism. The first outer member includes an outer tube portion, an inner tube portion, a coupling portion, and a rib, the outer tube portion, the inner tube portion, the coupling portion, and the rib are integrated, the outer tube portion is a cylindrical member, an inner peripheral surface of the outer tube portion is in contact with an outer peripheral surface of the first rotor core, an outer peripheral surface of the outer tube portion is opposed to an inner peripheral surface of the case, the inner tube portion is a cylindrical member disposed radially inward of the outer tube portion, and is in contact with the first inner member, the coupling portion couples one end of the outer tube portion and one end of the inner tube portion, a radially outer end portion of the coupling portion is located radially outward of the first stator core, a radially inner end portion of the coupling portion is located radially inward of the first stator core, the outer tube portion is located radially outward of the first stator core, the inner tube portion is located radially inward of the first stator core, and the rib is an annular member protruding from the coupling portion in an axial direction.

As a desirable embodiment of the electric vehicle drive device, a protrusion provided on one of the inner peripheral surface of the outer tube portion and the outer peripheral surface of the first rotor core is fitted into a recess provided in another of the inner peripheral surface of the outer tube portion and the outer peripheral surface of the first rotor core.

As a desirable embodiment of the electric vehicle drive device, the outer tube portion and the first rotor core are coupled by spigot joint.

As a desirable embodiment of the electric vehicle drive device, the first rotor core is positioned in the axial direction by a first positioning ring attached to the first rotor holding member, and the outer tube portion includes a recess that is a groove into which the first positioning ring is fitted.

As a desirable embodiment of the electric vehicle drive device, the first inner member is fixed to the inner tube portion, and includes a small tube portion, a large tube portion, and a flange, the small tube portion, the large tube portion, and the flange are integrated, the small tube portion is a cylindrical member, and includes a spline in an inner peripheral surface thereof, the spline is fitted into a spline provided at an end portion of the sun gear shaft, the large tube portion is a cylindrical member, and is in contact with an inner peripheral surface of the first outer member, and the flange is an annular member protruding from an outer peripheral surface of the large tube portion in a radial direction, and positions the first outer member.

As a desirable embodiment of the electric vehicle drive device, the first motor includes a plurality of first magnets provided on an inner peripheral surface of the first rotor core, and the first magnets are opposed to the first stator core with a gap therebetween.

As a desirable embodiment, the electric vehicle drive device includes a case that supports the first motor, the second motor, and the transmission mechanism, and a first rotation angle detector fixed to the case. The first motor includes a first member to be detected for detecting a rotation angle of the first rotor core, the first member to be detected is configured to rotate together with the first rotor holding member and is opposed to the first rotation angle detector, and the first rotation angle detector detects magnetic flux of the first member to be detected to calculate the rotation angle of the first rotor core.

As a desirable embodiment of the electric vehicle drive device, the transmission mechanism includes a first sun gear configured to rotate together with the sun gear shaft, a first pinion gear engaged with the first sun gear, and a first ring gear engaged with the first pinion gear and coupled to the second motor.

Advantageous Effects of Invention

The present invention can provide an electric vehicle drive device capable of changing speed and reducing the outer diameter of a case.

DESCRIPTION OF EMBODIMENTS

Embodiments of the present invention are described in detail with reference to the drawings. The present invention is not limited to contents described in the following embodiments. Components described below include the ones that can be easily conceived by a person skilled in the art and the ones that are substantially the same. In addition, the components described below can be omitted, replaced, or changed within the range not departing from the gist of the invention.

Figure 1:
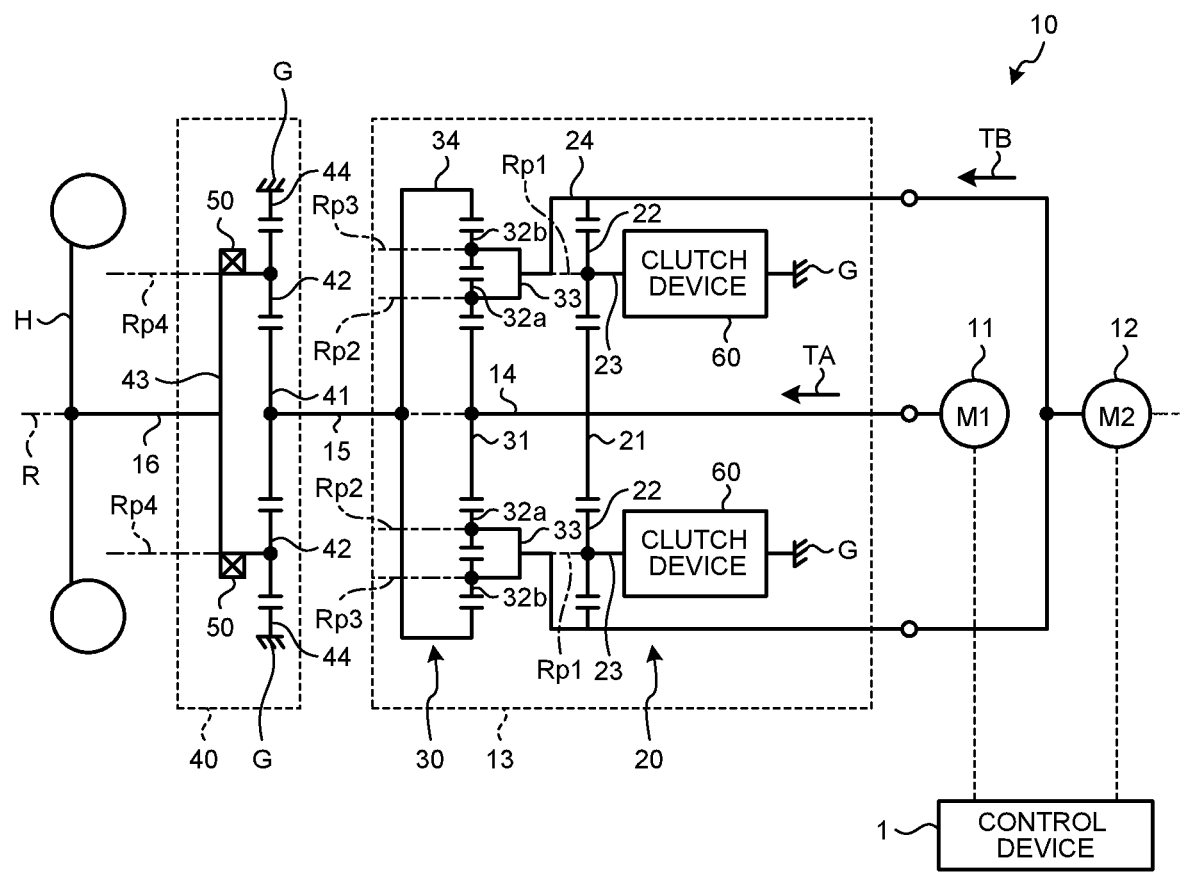
FIG. 1 is a schematic diagram illustrating a configuration of an electric vehicle drive device according to the present embodiment.

FIG. 1 is a schematic diagram illustrating a configuration of an electric vehicle drive device according to the present embodiment. An electric vehicle drive device 10 includes a case G, a first motor 11, a second motor 12, a transmission mechanism 13, a reducing mechanism 40, a wheel bearing 50, a wheel input/output shaft 16, and a control device 1. The case G supports the first motor 11, the second motor 12, the transmission mechanism 13, and the reducing mechanism 40.

The first motor 11 can output first torque TA. The second motor 12 can output second torque TB. The transmission mechanism 13 is coupled to the first motor 11. In this manner, when the first motor 11 operates, the first torque TA is transmitted (input) from the first motor 11 to the transmission mechanism 13. The transmission mechanism 13 is coupled to the second motor 12. In this manner, when the second motor 12 operates, the second torque TB is transmitted (input) from the second motor 12 to the transmission mechanism 13. The operation of the motor as used herein refers to an operation in which the input/output shaft of the first motor 11 or the second motor 12 rotates when power is supplied to the first motor 11 or the second motor 12.

The transmission mechanism 13 is coupled to the first motor 11, the second motor 12, and the wheel input/output shaft 16, and can change a reduction ratio (ratio of an input angular velocity to an angular velocity output to the transmission mechanism 13). The transmission mechanism 13 includes a sun gear shaft 14, a first planetary gear mechanism 20, a second planetary gear mechanism 30, and a clutch device 60.

The sun gear shaft 14 is coupled to the first motor 11. When the first motor 11 operates, the sun gear shaft 14 rotates around a rotation axis R.

For example, the first planetary gear mechanism 20 is a single-pinion planetary gear mechanism. The first planetary gear mechanism 20 includes a first sun gear 21, a first pinion gear 22, a first carrier 23, and a first ring gear 24.

The first sun gear 21 is coupled to the sun gear shaft 14. The first sun gear 21 can rotate about the rotation axis R together with the sun gear shaft 14. When the first motor 11 operates, the first torque TA is transmitted from the first motor 11 to the first sun gear 21. In this manner, when the first motor 11 operates, the first sun gear 21 rotates about the rotation axis R. The first pinion gear 22 is engaged with the first sun gear 21.

The first carrier 23 is supported by the sun gear shaft 14. The first carrier 23 supports the first pinion gear 22 such that the first pinion gear 22 can rotate about a first pinion rotation axis Rp1. For example, the first pinion rotation axis Rp1 is parallel to the rotation axis R. The first carrier 23 supports the first pinion gear 22 such that the first pinion gear 22 can revolve about the rotation axis R.

The first ring gear 24 is engaged with the first pinion gear 22. The first ring gear 24 can rotate about the rotation axis R. The first ring gear 24 is coupled to the second motor 12. When the second motor 12 operates, the second torque TB is transmitted from the second motor 12 to the first ring gear 24. In this manner, when the second motor 12 operates, the first ring gear 24 rotates about the rotation axis R.

For example, the clutch device 60 is a one-way clutch device, and transmits only torque in a first direction but does not transmit torque in a second direction opposite to the first direction. The clutch device 60 is disposed between the case G and the first carrier 23. The clutch device 60 can restrict the rotation of the first carrier 23. Specifically, the clutch device 60 can switch between the state in which the rotation of the first carrier 23 centered at the rotation axis R is restricted (braked) and the state in which the rotation is allowed. In other words, the clutch device 60 sets the first carrier 23 to be freely rotatable with respect to the case G, and sets the first carrier 23 to be unrotatable with respect to the case G. In the following description, the state in which the clutch device 60 restricts (brakes) the rotation of the first carrier 23 is referred to as "braking state", and the state in which the clutch device 60 allows the first carrier 23 to rotate is referred to as "non-braking state".

For example, the second planetary gear mechanism 30 is a double-pinion planetary gear mechanism. The second planetary gear mechanism 30 includes a second sun gear 31, a second pinion gear 32a, a third pinion gear 32b, a second carrier 33, and a second ring gear 34.

The second sun gear 31 is coupled to the sun gear shaft 14. When the first motor 11 operates, the first torque TA is transmitted from the first motor 11 to the second sun gear 31. The second sun gear 31 can rotate about the rotation axis R together with the sun gear shaft 14 and the first sun gear 21. The second pinion gear 32a is engaged with the second sun gear 31. The third pinion gear 32b is engaged with the second pinion gear 32a.

The second carrier 33 is supported by the sun gear shaft 14. The second carrier 33 supports the second pinion gear 32a such that the second pinion gear 32a can rotate about a second pinion rotation axis Rp2. The second carrier 33 supports the third pinion gear 32b such that the third pinion gear 32b can rotate about a third pinion rotation axis Rp3. For example, the second pinion rotation axis Rp2 and the third pinion rotation axis Rp3 are parallel to the rotation axis R. The second carrier 33 supports the second pinion gear 32a and the third pinion gear 32b such that the second pinion gear 32a and the third pinion gear 32b can revolve about the rotation axis R. The second carrier 33 is coupled to the first ring gear 24. In this manner, the second carrier 33 rotates about the rotation axis R when the first ring gear 24 rotates.

The second ring gear 34 is engaged with the third pinion gear 32b. The second ring gear 34 can rotate about the rotation axis R. The second ring gear 34 is coupled to a transmission mechanism input/output shaft 15 of the transmission mechanism 13. In this manner, when the second ring gear 34 rotates, the transmission mechanism input/output shaft 15 rotates.

The reducing mechanism 40 is disposed between the transmission mechanism 13 and a wheel H of an electric vehicle. The reducing mechanism 40 reduces the angular velocity of the transmission mechanism input/output shaft 15 and outputs the resultant to the wheel input/output shaft 16. The wheel input/output shaft 16 is coupled to the wheel H of the electric vehicle, and transmits power between the reducing mechanism 40 and the wheel H. Torque generated by at least one of the first motor 11 and the second motor 12 is transmitted to the wheel H through the transmission mechanism 13 and the reducing mechanism 40. On the other hand, torque generated by the wheel H when the electric vehicle travels on a downhill is transmitted to at least one of the first motor 11 and the second motor 12 through the reducing mechanism 40 and the transmission mechanism 13. In this case, at least one of the first motor 11 and the second motor 12 operates as a generator. The rotational resistance during power generation functions as braking force on the electric vehicle as regenerative braking. The reducing mechanism 40 includes a third sun gear 41, a fourth pinion gear 42, a third carrier 43, and a third ring gear 44.

The third sun gear 41 is coupled to the transmission mechanism input/output shaft 15. Specifically, the third sun gear 41 is coupled to the second ring gear 34 through the transmission mechanism input/output shaft 15. The fourth pinion gear 42 is engaged with the third sun gear 41. The third carrier 43 supports the fourth pinion gear 42 such that the fourth pinion gear 42 can rotate about a fourth pinion rotation axis Rp4 and the fourth pinion gear 42 can revolve about the third sun gear 41. The third ring gear 44 is engaged with the fourth pinion gear 42 and fixed to the case G. The third carrier 43 is coupled to the wheel H through the wheel input/output shaft 16. The third carrier 43 is rotatably supported by the wheel bearing 50.

The reducing mechanism 40 drives the wheel H by rotating the wheel input/output shaft 16 at a velocity slower than the angular velocity of the transmission mechanism input/output shaft 15. Thus, even when the maximum torque of the first motor 11 and the second motor 12 is small, the electric vehicle drive device 10 can transmit torque necessary when the vehicle starts and climbs (ascends a hill) to the wheel H. As a result, currents for operating the first motor 11 and the second motor 12 can be reduced, and the first motor 11 and the second motor 12 can be reduced in size and weight. Therefore, the manufacturing cost and the weight of the electric vehicle drive device 10 can be reduced.

The control device 1 controls the operation of the electric vehicle drive device 10. Specifically, the control device 1 controls the angular velocities, the rotation directions, and the outputs of the first motor 11 and the second motor 12. For example, the control device 1 is a microcomputer.

Figure 2:
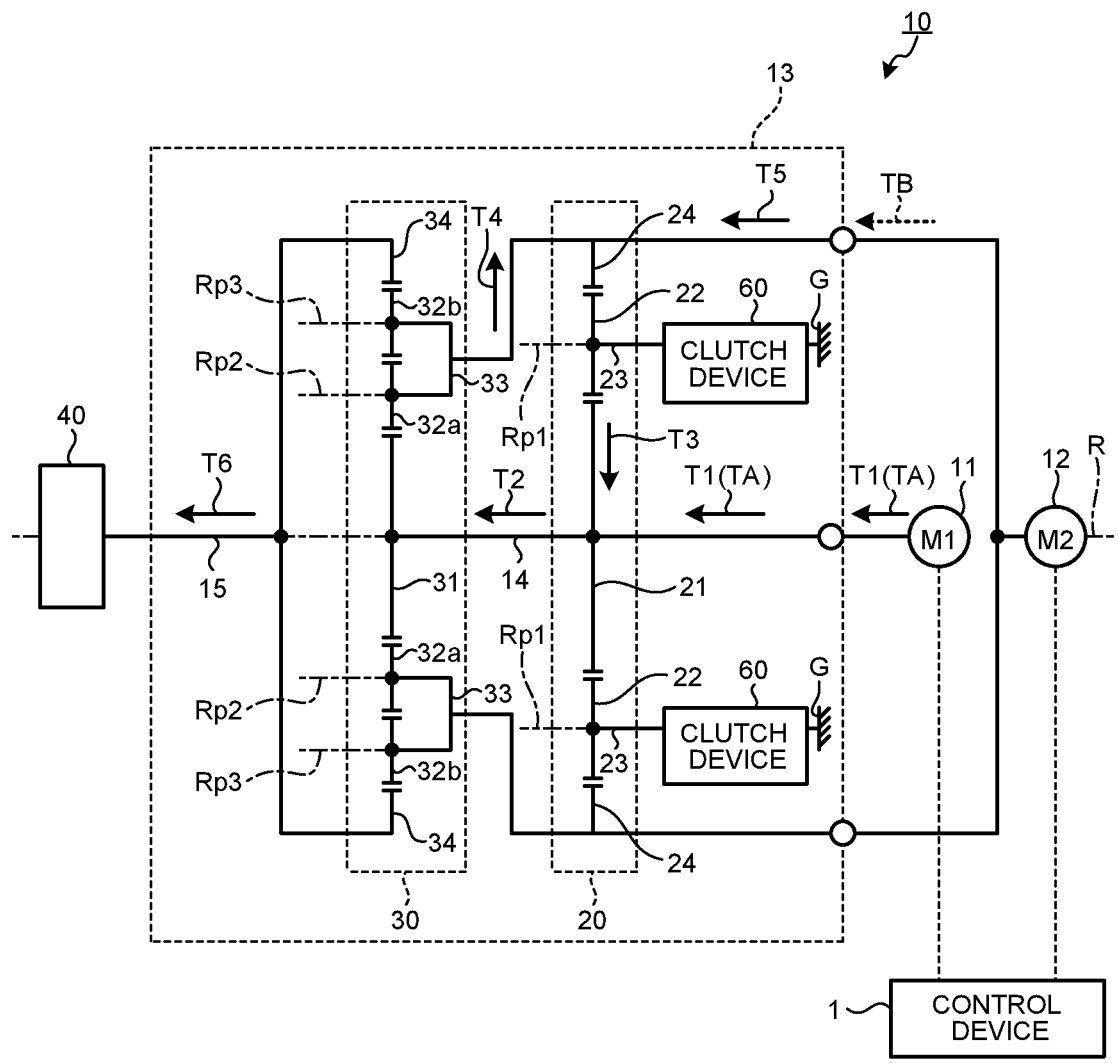
FIG. 2 is a schematic diagram illustrating a route in which torque is transmitted when the electric vehicle drive device according to the present embodiment is in a first gear change state.

FIG. 2 is a schematic diagram illustrating a route through which torque is transmitted when the electric vehicle drive device according to the present embodiment is in a first gear change state. The electric vehicle drive device 10 can implement two gear change states, a first gear change state and a second gear change state.

The first gear change state is what is called a low gear state, and the reduction ratio can be increased. Specifically, in the first gear change state, the torque transmitted to the transmission mechanism input/output shaft 15 increases. The first gear change state is mainly used in the case where large driving power is necessary when the electric vehicle travels. For example, the case where large driving power is necessary is a case where the vehicle starts on a hill or climbs (ascends a hill). In the first gear change state, the magnitudes of torques generated by the first motor 11 and the second motor 12 are equal, and the directions of the torques are opposite. The torque generated by the first motor 11 is input to the first sun gear 21. The torque generated by the second motor 12 is input to the first ring gear 24. In the first gear change state, the clutch device 60 is in the braking state. Specifically, in the first gear change state, the first pinion gear 22 can rotate but cannot revolve.

It is assumed that the torque output by the first motor 11 and the torque output by the second motor 12 in the first gear change state are first torque T1 and second torque T5, respectively. The first torque T1 output from the first motor 11 is input to the first sun gear 21 through the sun gear shaft 14. Then, the first torque T1 merges with circulating torque T3 at the first sun gear 21 to become combined torque T2. The combined torque T2 is output from the first sun gear 21. The circulating torque T3 is a torque transmitted from the first ring gear 24 to the first sun gear 21.

The first sun gear 21 and the second sun gear 31 are coupled by the sun gear shaft 14. Thus, in the first gear change state, the combined torque T2 output from the first sun gear 21 is transmitted to the second sun gear 31 through the sun gear shaft 14. Then, the combined torque T2 is amplified by the second planetary gear mechanism 30. The combined torque T2 is distributed by the second planetary gear mechanism 30 into first distribution torque T6 and second distribution torque T4. A first distribution torque T6 is a torque obtained when the combined torque T2 is distributed to the second ring gear 34 and amplified, and is output from the transmission mechanism input/output shaft 15. The second distribution torque T4 is torque obtained when the combined torque T2 is distributed to the second carrier 33 and amplified.

The first distribution torque T6 is output from the transmission mechanism input/output shaft 15 to the reducing mechanism 40. Then, the first distribution torque T6 is amplified by the reducing mechanism 40, and output to the wheel H through the wheel input/output shaft 16 illustrated in FIG. 1. As a result, the electric vehicle travels.

The second carrier 33 and the first ring gear 24 rotate integrally. The second distribution torque T4 distributed to the second carrier 33 merges with the second torque T5 of the second motor 12 at the first ring gear 24. The direction of the second torque T5 (torque of second motor 12) is opposite to the direction of the torque of the first motor 11.

The first planetary gear mechanism 20 reduces the magnitude of combined torque of the second torque T5 and the second distribution torque T4 returned to the first ring gear 24, and the direction of the combined torque of the second torque T5 and the second distribution torque T4 is reversed. Combined torque of the second torque T5 and the second distribution torque T4 becomes circulating torque T3 in the first sun gear 21. In this manner, the circulation of torque between the first planetary gear mechanism 20 and the second planetary gear mechanism 30 is generated, and hence the transmission mechanism 13 can increase the reduction ratio. In other words, the electric vehicle drive device 10 can generate large torque in the first gear change state.

Figure 3:
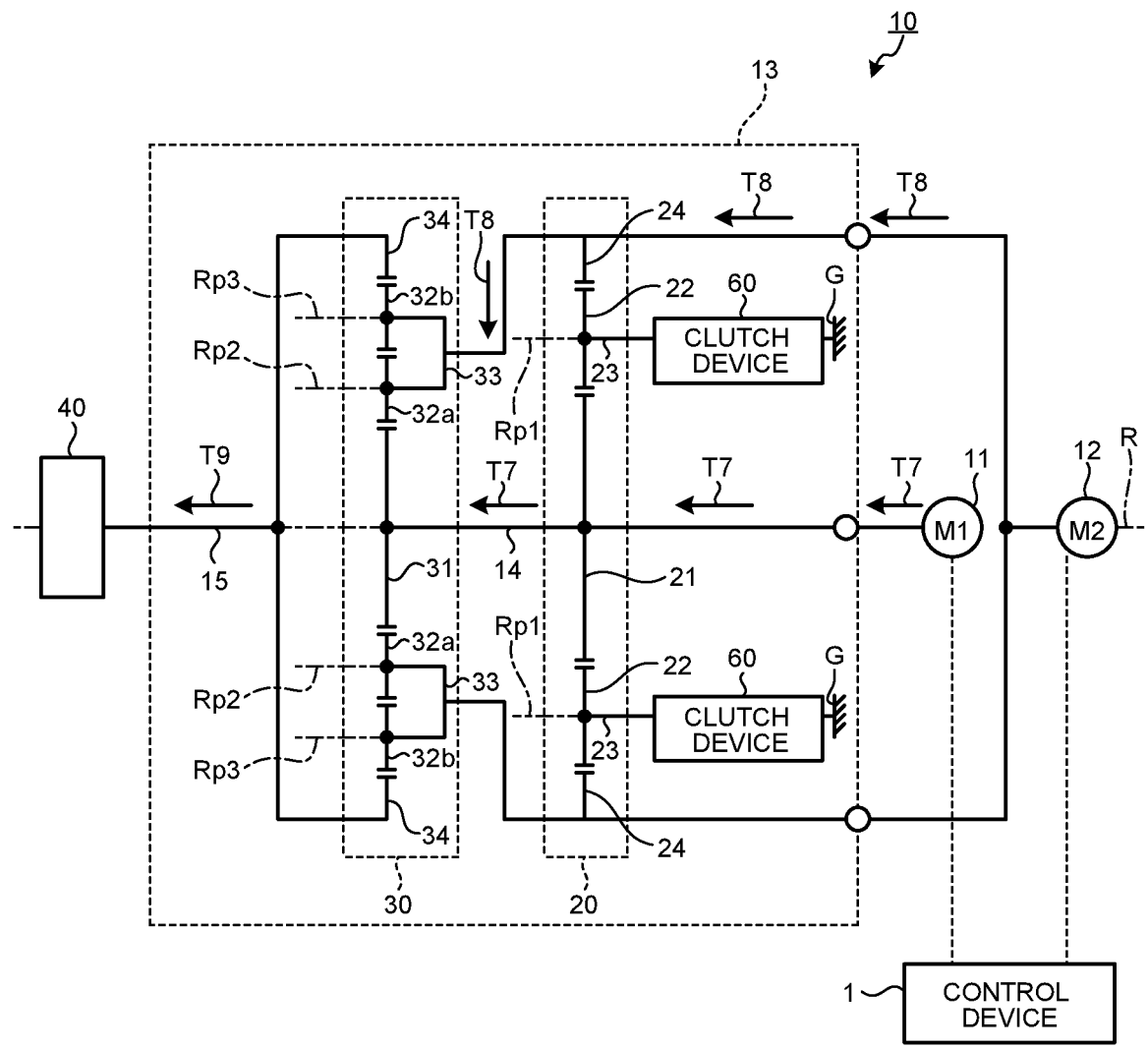
FIG. 3 is a schematic diagram illustrating a route in which torque is transmitted when the electric vehicle drive device according to the present embodiment is in a second gear change state.

FIG. 3 is a schematic diagram illustrating a route through which torque is transmitted when the electric vehicle drive device according to the present embodiment is in the second gear change state. The second gear change state is what is called a high gear state, and the reduction ratio can be reduced. Specifically, the torque transmitted to the transmission mechanism input/output shaft 15 is reduced but the friction loss of the transmission mechanism 13 is reduced. In the second gear change state, the magnitudes and the directions of the torques generated by the first motor 11 and the second motor 12 are equal. Torque output by the first motor 11 and torque output by the second motor 12 in the second gear change state are first torque T7 and second torque T8, respectively. Combined torque T9 illustrated in FIG. 3 is torque output from the transmission mechanism input/output shaft 15 and transmitted to the reducing mechanism 40.

In the second gear change state, the torque of the first motor 11 is input to the first sun gear 21, and the torque of the second motor 12 is input to the first ring gear 24. In the second gear change state, the clutch device 60 is in the non-braking state. In other words, in the first gear change state, the first pinion gear 22 can rotate and revolve. In this manner, in the second gear change state, the circulation of torque between the first planetary gear mechanism 20 and the second planetary gear mechanism 30 is interrupted. In the second gear change state, the first carrier 23 can revolve, and hence the first sun gear 21 and the first ring gear 24 can relatively rotate freely.

In the second gear change state, the ratio of the second torque T8 to the first torque T7 is determined by the ratio of the number of teeth of the second ring gear 34 to the number of teeth of the second sun gear 31. The first torque T7 merges with the second torque T8 in the second carrier 33. As a result, the combined torque T9 is transmitted to the second ring gear 34.

The angular velocity of the transmission mechanism input/output shaft 15 is determined by the angular velocity of the second sun gear 31 driven by the first motor 11 and the angular velocity of the second carrier 33 driven by the second motor 12. Thus, even when the angular velocity of the transmission mechanism input/output shaft 15 is constant, the combination of the angular velocity of the first motor 11 and the angular velocity of the second motor 12 can be changed.

As described above, the combination of the angular velocity of the transmission mechanism input/output shaft 15, the angular velocity of the first motor 11, and the angular velocity of the second motor 12 is not uniquely determined. Thus, when the control device 1 continuously and smoothly controls the angular velocity of the first motor 11 and the angular velocity of the second motor 12, what is called shift shock is reduced even if the state of the transmission mechanism 13 has changed between the first gear change state and the second gear change state.

When the angular velocity of the second sun gear 31 is constant, the angular velocity of the second ring gear 34 becomes slower as the angular velocity of the second carrier 33 becomes faster. As the angular velocity of the second carrier 33 becomes slower, the angular velocity of the second ring gear 34 becomes faster. Thus, the angular velocity of the second ring gear 34 continuously changes depending on the angular velocity of the second sun gear 31 and the angular velocity of the second carrier 33. Consequently, the electric vehicle drive device 10 can continuously change the reduction ratio by changing the angular velocity of the second torque T8 output by the second motor 12.

The electric vehicle drive device 10 has a plurality of combinations of the angular velocity of the first torque T7 output by the first motor 11 and the angular velocity of the second torque T8 output by the second motor 12 when maintaining the angular velocity of the second ring gear 34 constant. Specifically, for example, even when the angular velocity of the first torque T7 output by the first motor 11 changes, the angular velocity of the second torque T8 output by the second motor 12 changes, and hence the angular velocity of the second ring gear 34 is maintained constant. Thus, the electric vehicle drive device 10 can reduce the change amount of the angular velocity of the second ring gear 34 when the first gear change state is switched to the second gear change state. As a result, the electric vehicle drive device 10 can reduce shift shock.

Figure 4:
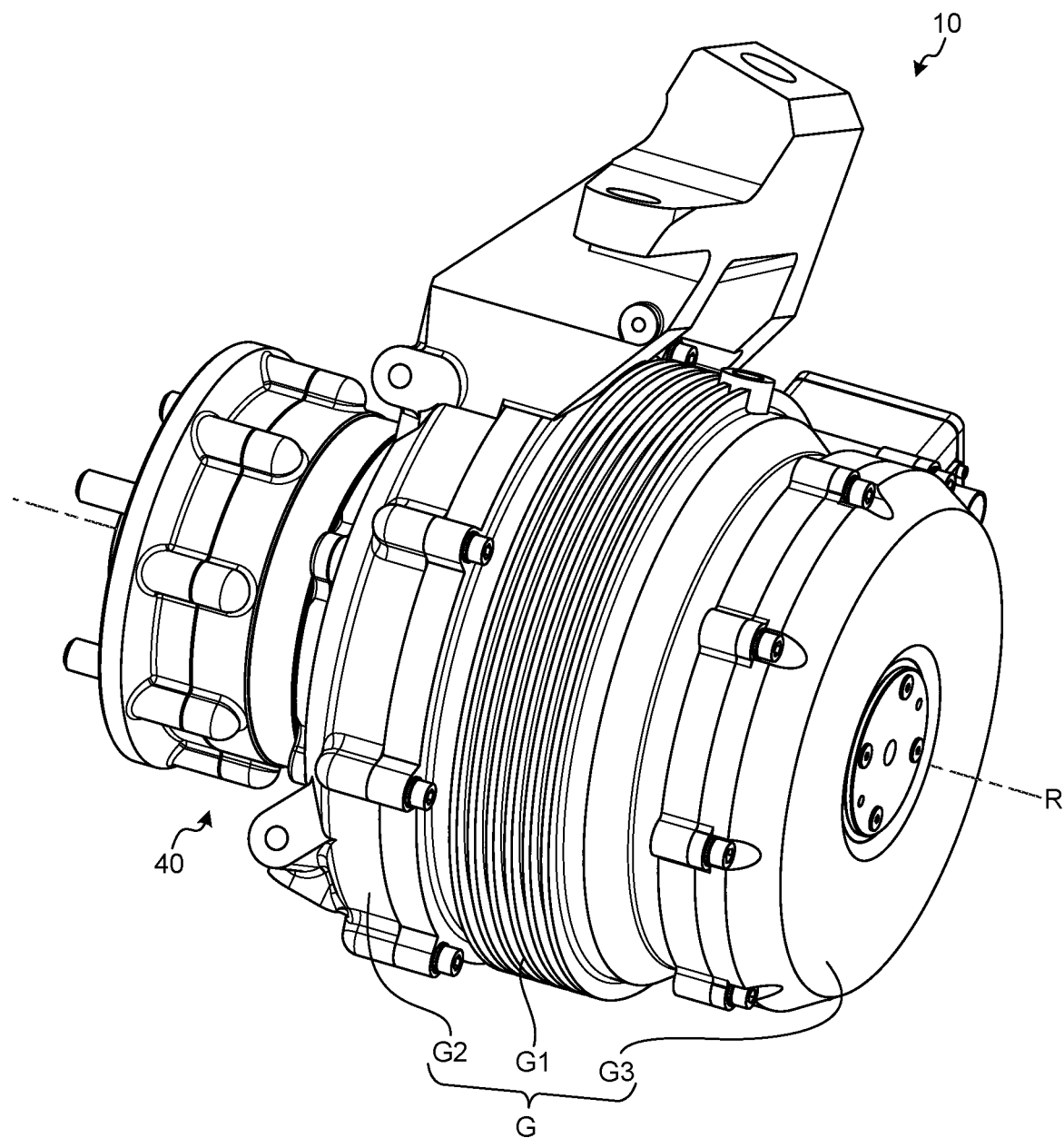
FIG. 4 is a perspective view of the electric vehicle drive device according to the present embodiment.
Figure 5:
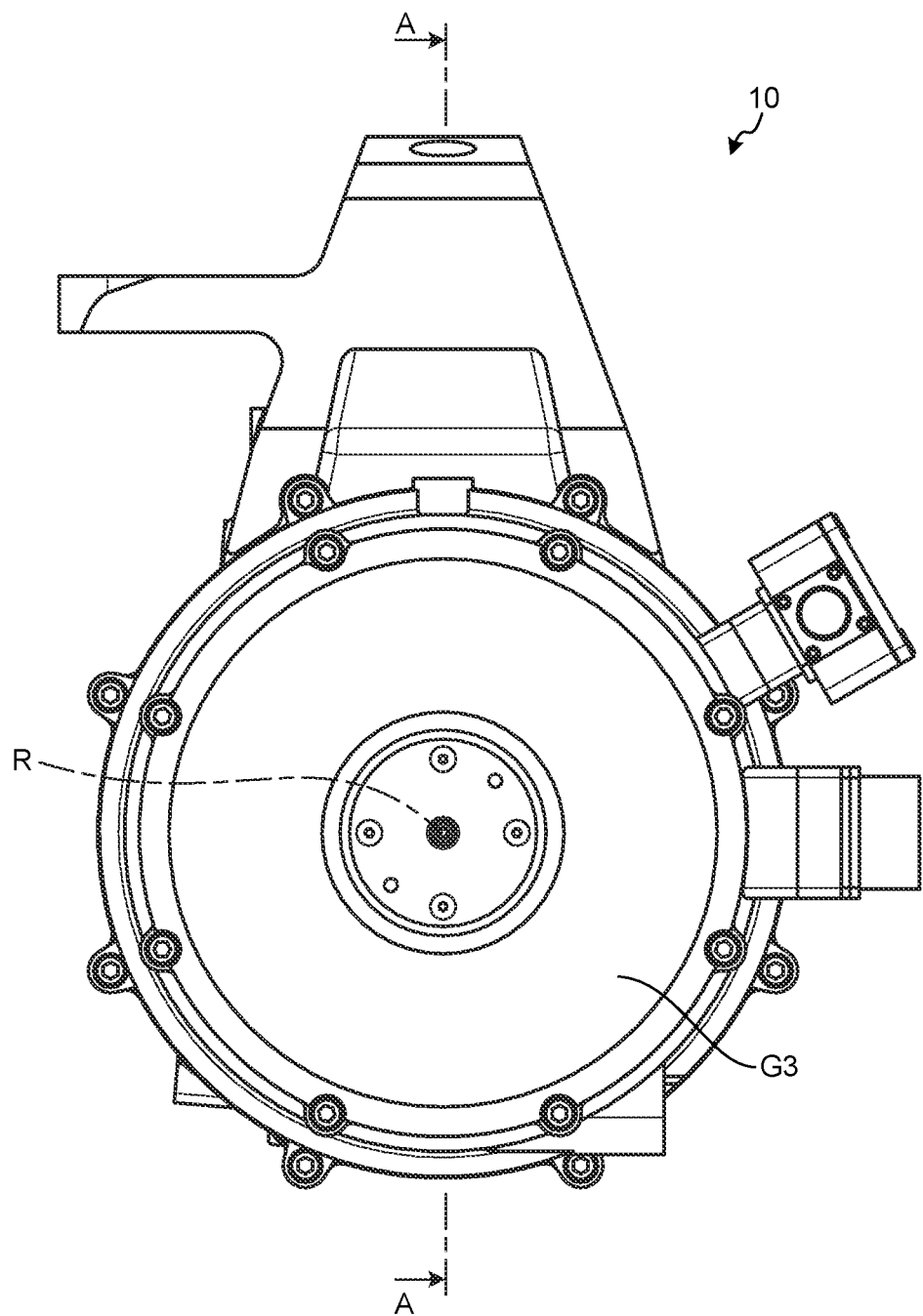
FIG. 5 is a front view of the electric vehicle drive device according to the present embodiment.
Figure 6:
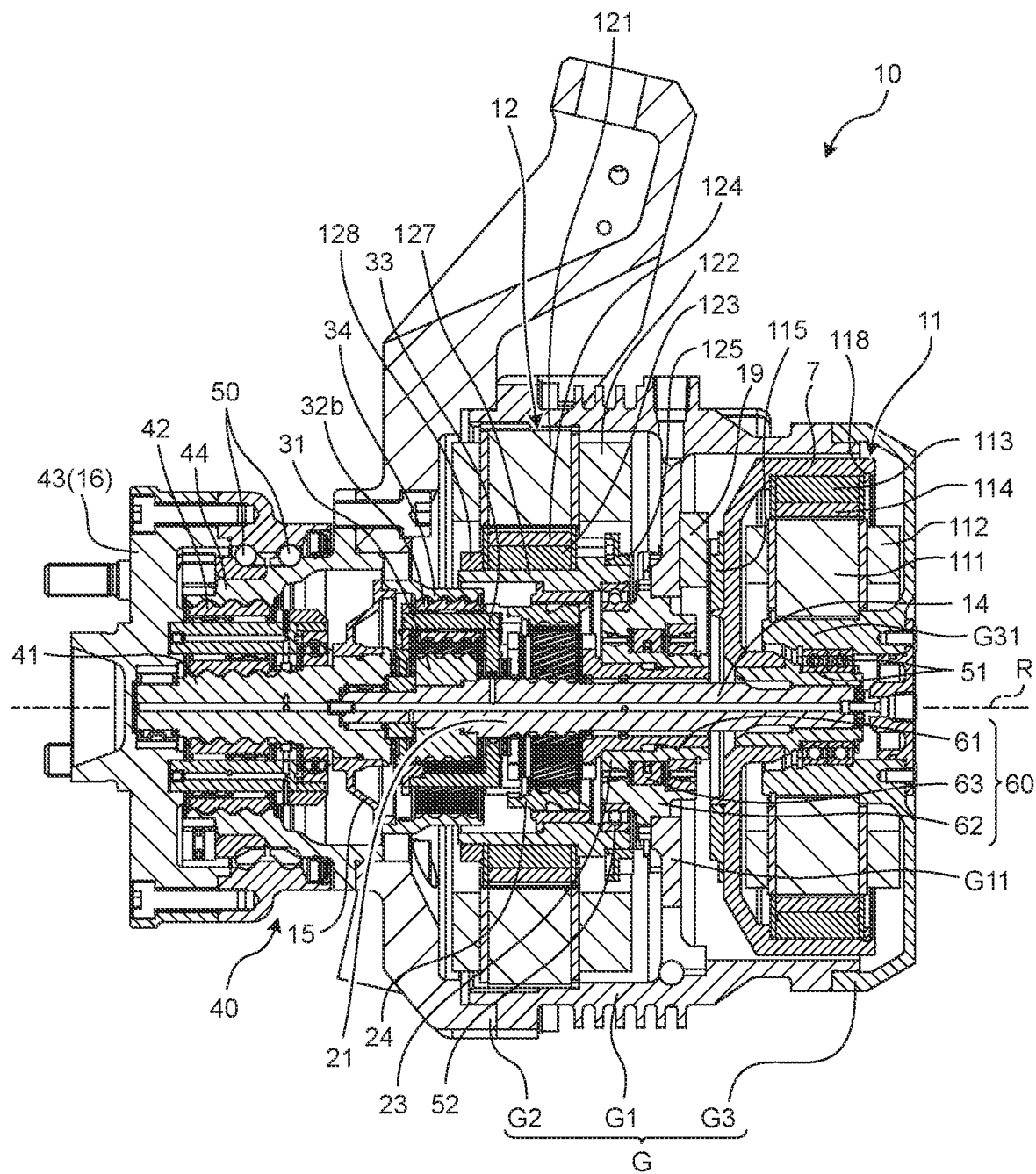
FIG. 6 is a cross-sectional view taken along the line A-A in FIG. 5.
Figure 7:
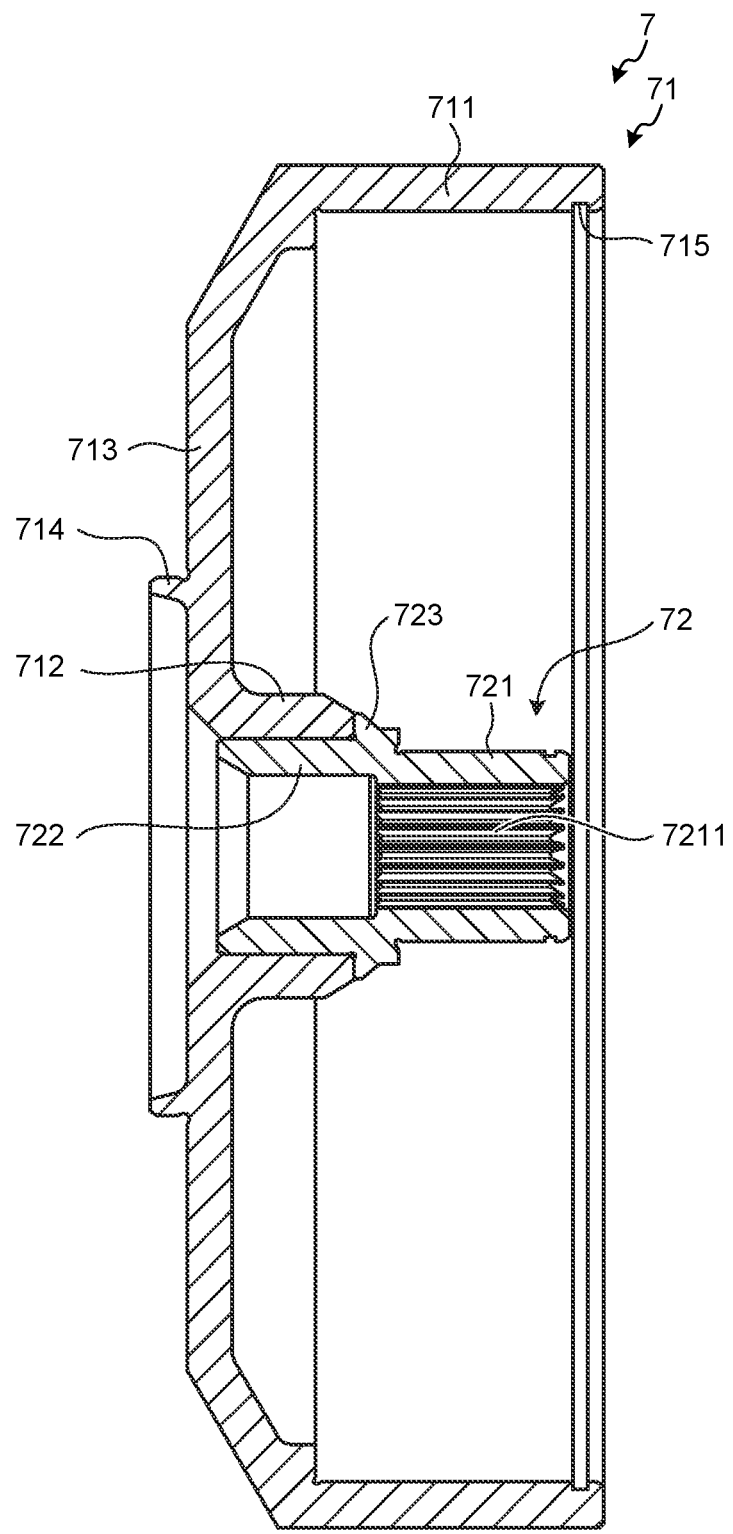
FIG. 7 is an enlarged cross-sectional view of a first rotor holding member in FIG. 6.

FIG. 4 is a perspective view of the electric vehicle drive device according to the present embodiment. FIG. 5 is a front view of the electric vehicle drive device according to the present embodiment. FIG. 6 is a cross-sectional view taken along the line A-A in FIG. 5. FIG. 7 is an enlarged cross-sectional view of the first rotor holding member in FIG. 6. In the following description, overlapping descriptions of the above-mentioned components are omitted, and the components are denoted by the same reference symbols in the figures. The axial direction of the first motor 11 (direction along the rotation axis R) is simply referred to as "axial direction". The radial direction of the first motor 11 (direction orthogonal to the rotation axis R) is simply referred to as "radial direction". The circumferential direction of the first motor 11 (tangential direction of a circle centered at the rotation axis R) is simply referred to as "circumferential direction".

As illustrated in FIG. 4 and FIG. 6, the case G includes a case G1, a case G2, and a case G3. As illustrated in FIG. 6, the case G1 is a cylindrical member and includes an annular partition wall G11 protruding from the inner wall. The partition wall G11 isolates the first motor 11 and the second motor 12 from each other. Specifically, the first motor 11 is disposed on one side of the partition wall G11, and the second motor 12 is disposed on the other side of the partition wall G11. The case G2 is a cylindrical member and provided on the wheel H side with respect to the case G1. For example, the case G2 is fastened to the case G1 through a plurality of bolts.

As illustrated in FIG. 6, the case G3 is provided to an end surface of the two end surfaces of the case G1 on the side opposite to the case G2, that is, an end surface of the case G1 on the vehicle body side. The vehicle body side means the side opposite to the wheel H side, and the same meaning is used in the following. For example, the case G3 is fastened to the case G1 through a plurality of bolts. The case G3 closes an opening in the case G1 on the vehicle body side. The case G3 covers a part of the side surface of the first motor 11 and the end surface of the first motor 11. The case G3 includes a first motor holding unit G31 having a cylindrical shape protruding from the surface opposed to the end surface of the first motor 11 to the wheel H side. As seen from the axial direction, the center of the first motor holding unit G31 is aligned with the rotation axis R. In other words, the first motor holding unit G31 is a cylindrical member coaxial with the sun gear shaft 14. The first motor holding unit G31 is disposed between the sun gear shaft 14 and a first stator core 111 described later.

As illustrated in FIG. 6, the clutch device 60 is fixed to the partition wall G11. The clutch device 60 is what is called a cam clutch device, and includes an inner race 61, an outer race 62, and a roller 63. The inner race 61 is coupled to the first carrier 23. Specifically, a spline provided in an inner peripheral surface of the inner race 61 is fitted into a spline provided in the outer peripheral surface of the first carrier 23. The outer race 62 is fixed to the partition wall G11. The roller 63 is disposed between the inner race 61 and the outer race 62. The roller 63 is supported by the inner race 61, and rotates together with the inner race 61. When the inner race 61 rotates in the first direction, the roller 63 is engaged with the outer race 62. In this manner, the inner race 61 cannot rotate, and hence the first carrier 23 cannot rotate. On the other hand, when the inner race 61 rotates in the second direction opposite to the first direction, the roller 63 is not engaged with the outer race 62. In this manner, the inner race 61 can rotate, and hence the first carrier 23 can also rotate.

As illustrated in FIG. 6, the first motor 11 includes the first stator core 111, a first coil 112, a first rotor core 113, a first rotor holding member 7, a first positioning ring 118, a first magnet 114, and a first member to be detected 115.

The first stator core 111 is a cylindrical member, and is fixed to an outer peripheral surface of the first motor holding unit G31 in the case G3. The first coils 112 are provided at a plurality of locations on the first stator core 111. The first coils 112 are wound around the first stator core 111 through an insulator.

The first rotor core 113 is a cylindrical member, and is disposed radially outward of the first stator core 111. In other words, the first rotor core 113 is disposed on the outer circumference of the first stator core 111. The first motor 11 is an outer rotor motor. The first rotor core 113 is fixed to the first rotor holding member 7. The first rotor holding member 7 is supported by an inner peripheral surface of the first motor holding unit G31 through a bearing 51, and is coupled to the sun gear shaft 14. The first rotor core 113 rotates about the rotation axis R together with the first rotor holding member 7 and the sun gear shaft 14. The first rotor core 113 is positioned in the axial direction by the first positioning ring 118 attached to the first rotor holding member 7. As illustrated in FIG. 7, the first rotor holding member 7 includes a first outer member 71 and a first inner member 72.

As illustrated in FIG. 7, the first outer member 71 includes an outer tube portion 711, an inner tube portion 712, a coupling portion 713, and a rib 714. The outer tube portion 711, the inner tube portion 712, the coupling portion 713, and the rib 714 are integrally formed. The outer tube portion 711 is a cylindrical member, and is in contact with an outer peripheral surface of the first rotor core 113. An outer peripheral surface of the outer tube portion 711 is opposed to the inner peripheral surface of the case G1. For example, a protrusion provided on one of the inner peripheral surface of the outer tube portion 711 and the outer peripheral surface of the first rotor core 113 is fitted into a recess provided in the other. Specifically, the outer tube portion 711 and the first rotor core 113 are coupled by what is called spigot joint. A recess 715 is provided at an end portion of the outer tube portion 711 on the vehicle body side. The recess 715 is a groove into which the first positioning ring 118 is fitted. The inner tube portion 712 is a cylindrical member disposed radially inward of the outer tube portion 711, and is in contact with the first inner member 72. The coupling portion 713 couples one end of the outer tube portion 711 and one end of the inner tube portion 712. For example, as illustrated in FIG. 6, a radially outer end portion of the coupling portion 713 is located radially outward of the first stator core 111. A radially inner end portion of the coupling portion 713 is located radially inward of the first stator core 111. In other words, the outer tube portion 711 is located radially outward of the first stator core 111. The inner tube portion 712 is located radially inward of the first stator core 111. The rib 714 is an annular member protruding from the coupling portion 713 in the axial direction. The rib 714 supports the first member to be detected 115 illustrated in FIG. 6.

The first inner member 72 is fixed to the inner tube portion 712 of the first outer member 71 by press-fit. As illustrated in FIG. 7, the first inner member 72 includes a small tube portion 721, a large tube portion 722, and a flange 723. The small tube portion 721, the large tube portion 722, and the flange 723 are integrally formed. The small tube portion 721 is a cylindrical member, and includes a spline 7211 in an inner peripheral surface thereof. The spline 7211 is fitted into a spline provided at an end portion of the sun gear shaft 14. The large tube portion 722 is a cylindrical member, and is in contact with an inner peripheral surface of the inner tube portion 712 of the first outer member 71. The flange 723 is an annular member protruding from the outer peripheral surface of the large tube portion 722 in the radial direction. The flange 723 is used to position the first outer member 71.

As illustrated in FIG. 6, a plurality of the first magnets 114 are provided on the inner peripheral surface of the first rotor core 113. The first magnets 114 are opposed to the first stator core 111 with a gap therebetween. The first member to be detected 115 is used to detect a rotation angle of the first rotor core 113. For example, the first member to be detected 115 is an annular member, and is fixed to an end portion of the first rotor holding member 7 on the wheel H side. The first member to be detected 115 rotates together with the first rotor holding member 7. The first member to be detected 115 is opposed to a first rotation angle detector 19 fixed to the partition wall G11. The first rotation angle detector 19 can detect magnetic flux of the first member to be detected 115 to calculate the rotation angle of the first rotor core 113.

As illustrated in FIG. 6, the second motor 12 is disposed on the wheel H side with respect to the first motor 11. The second motor 12 includes a second stator core 121, a second coil 122, a second rotor core 123, a second rotor holding member 127, a second positioning ring 128, a second magnet 124, and a second member to be detected 125.

The second stator core 121 is a cylindrical member, and is fixed to an inner peripheral surface of the case G1. The second coils 122 are provided at a plurality of locations on the second stator core 121. The second coils 122 are wound around the second stator core 121 through an insulator.

The second rotor core 123 is a cylindrical member, and is disposed radially inward of the second stator core 121. In other words, the second motor 12 is an inner rotor motor. The second rotor core 123 is fixed to the second rotor holding member 127. The second rotor holding member 127 is supported by the clutch device 60 through a bearing 52, and is coupled to the first ring gear 24. For example, a recess provided in the inner peripheral surface of the second rotor holding member 127 is fitted to a protrusion provided on the outer peripheral surface of the first ring gear 24. The second rotor core 123 rotates about the rotation axis R together with the second rotor holding member 127 and the first ring gear 24. The second rotor core 123 is positioned in the axial direction by the second positioning ring 128 attached to the second rotor holding member 127.

A plurality of the second magnets 124 are provided on the outer peripheral surface of the second rotor core 123. The second magnets 124 are opposed to the second stator core 121 with a gap therebetween. The second member to be detected 125 is used to detect a rotation angle of the second rotor core 123. For example, the second member to be detected 125 is an annular member, and is fixed to an end portion of the second rotor holding member 127 on the vehicle body side. The second member to be detected 125 rotates together with the second rotor holding member 127. The second member to be detected 125 is opposed to a second rotation angle detector fixed to the partition wall G11. The second rotation angle detector can detect magnetic flux of the second member to be detected 125 to calculate the rotation angle of the second rotor core 123. The control device 1 illustrated in FIG. 1 controls currents caused to flow through the first coil 112 and the second coil 122 based on the rotation angle of the first rotor core 113 detected by the first rotation angle detector 19 and the rotation angle of the second rotor core 123 detected by the second rotation angle detector.

Figure 8:
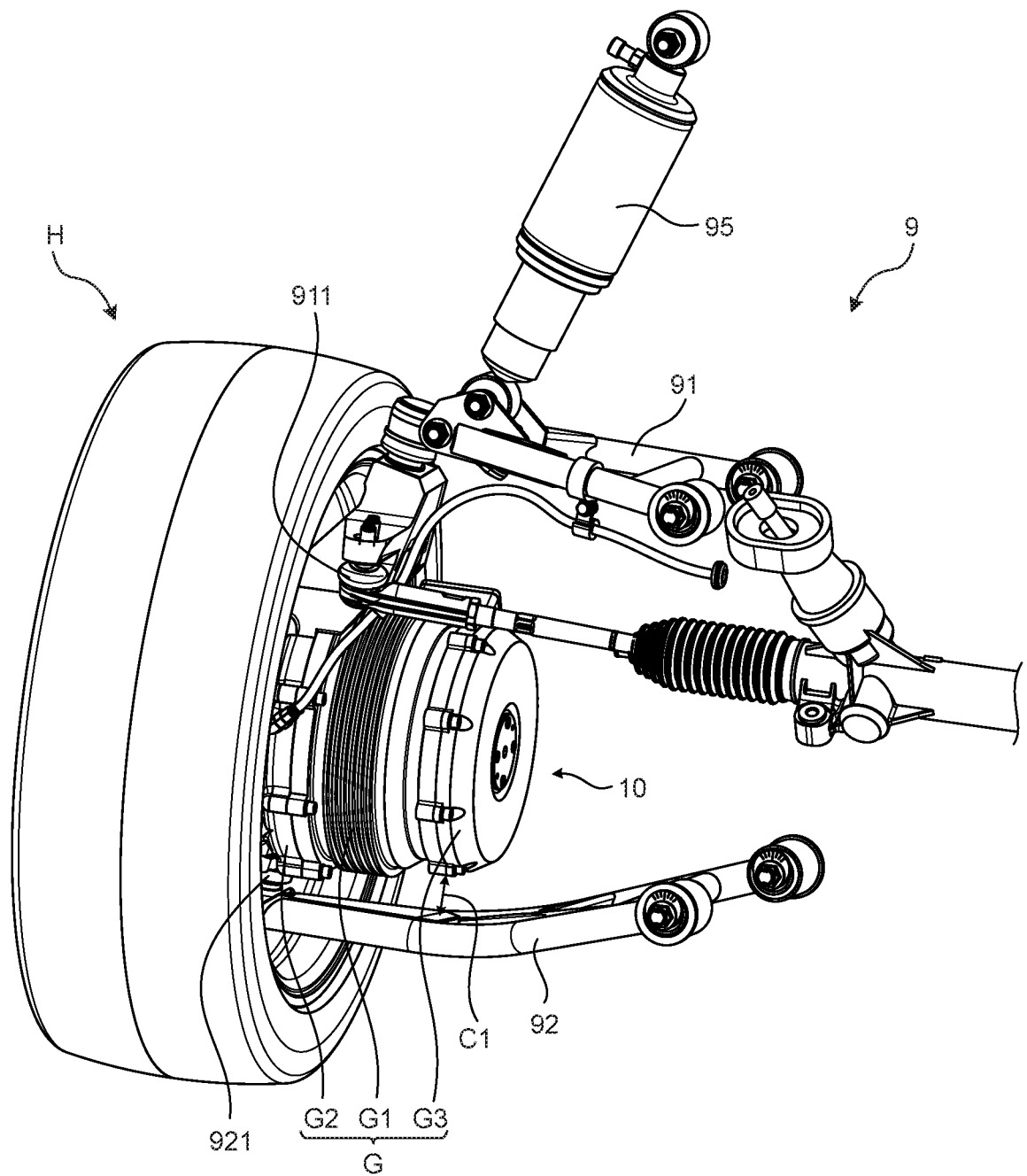
FIG. 8 is a perspective view illustrating the vicinity of a suspension of a vehicle using the electric vehicle drive device according to the present embodiment.

FIG. 8 is a perspective view illustrating the vicinity of a suspension of a vehicle using the electric vehicle drive device according to the present embodiment. A suspension 9 illustrated in FIG. 8 is a double wishbone suspension. The suspension 9 includes an upper arm 91, a lower arm 92, and a shock absorber 95.

The upper arm 91 is located on the upper side of the electric vehicle drive device 10. One end of the upper arm 91 is coupled to the vehicle body. The other end of the upper arm 91 is coupled to the wheel H through a ball joint 911. The lower arm 92 is located on the lower side of the electric vehicle drive device 10. One end of the lower arm 92 is coupled to the vehicle body. The other end of the lower arm 92 is coupled to the wheel H through a ball joint 921.

The shock absorber 95 is a device for reducing impact that is transmitted to the vehicle body from the road surface during traveling of the vehicle. One end of the shock absorber 95 is coupled to the upper arm 91. The other end of the shock absorber 95 is coupled to the vehicle body. The shock absorber 95 can expand and contract in the vertical direction. When the shock absorber 95 expands and contracts, the upper arm 91 rotates about the ball joint 911, and the lower arm 92 rotates about the ball joint 921.

For example, the shock absorber 95 contracts when the wheel H is pushed up by the road surface. The state in which the shock absorber 95 contracts most is called "full bump". When the shock absorber 95 contracts, the wheel H moves upward relative to one end (end portion coupled to the vehicle body) of the upper arm 91 and one end (end portion coupled to the vehicle body) of the lower arm 92. On the other hand, the shock absorber 95 expands when the vehicle body floats with respect to the wheel H (such as the starting of the vehicle). The state in which the shock absorber 95 expands most is called "full rebound". When the shock absorber 95 expands, the wheel H moves downward relative to one end (end portion coupled to the vehicle body) of the upper arm 91 and one end (end portion coupled to the vehicle body) of the lower arm 92.

In the suspension 9 illustrated in FIG. 8, a distance from the electric vehicle drive device 10 to the lower arm 92 is smaller than a distance from the electric vehicle drive device 10 to the upper arm 91. Thus, the stroke (maximum range of motion) of the shock absorber 95 is designed such that the lower arm 92 does not interfere with the electric vehicle drive device 10 during full rebound. In other words, the stroke of the shock absorber 95 is determined by a gap C1 between the case G3 and the lower arm 92. The ride quality of the vehicle improves when the stroke of the shock absorber 95 is sufficiently large. The outer diameter of the case G3 has an influence on the maximum turning angle of the wheel H. As the outer diameter of the case G3 becomes smaller, the maximum turning angle of the wheel H can be increased more easily. When the maximum turning angle of the wheel H is increased, the minimum turning radius of the vehicle is decreased, and hence the vehicle can easily turn. For the reason described above, it is desired that the outer diameter of the case G3 be smaller in consideration of the traveling performance of the vehicle.

Figure 9:
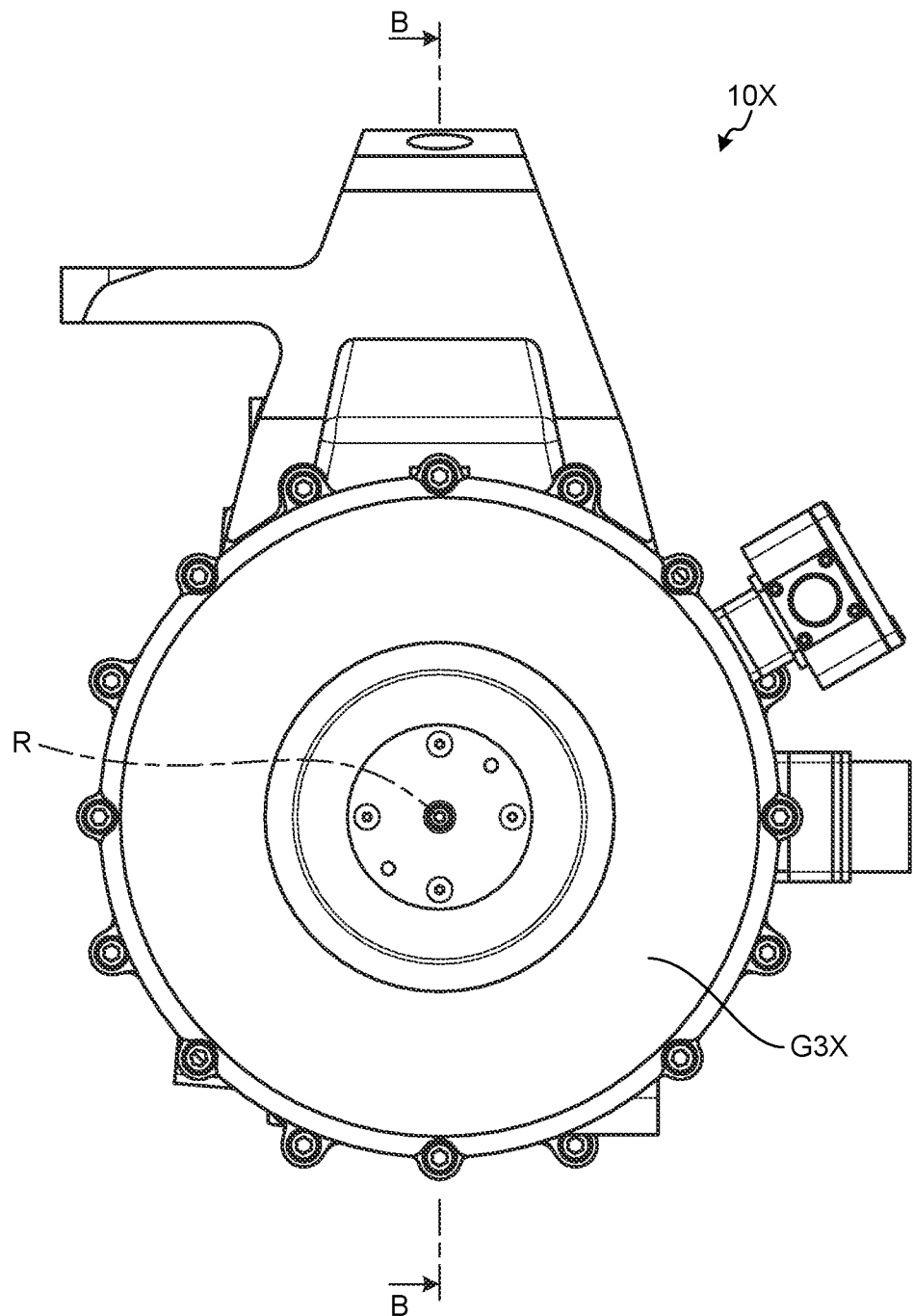
FIG. 9 is a front view of an electric vehicle drive device according to a comparative example.
Figure 10:
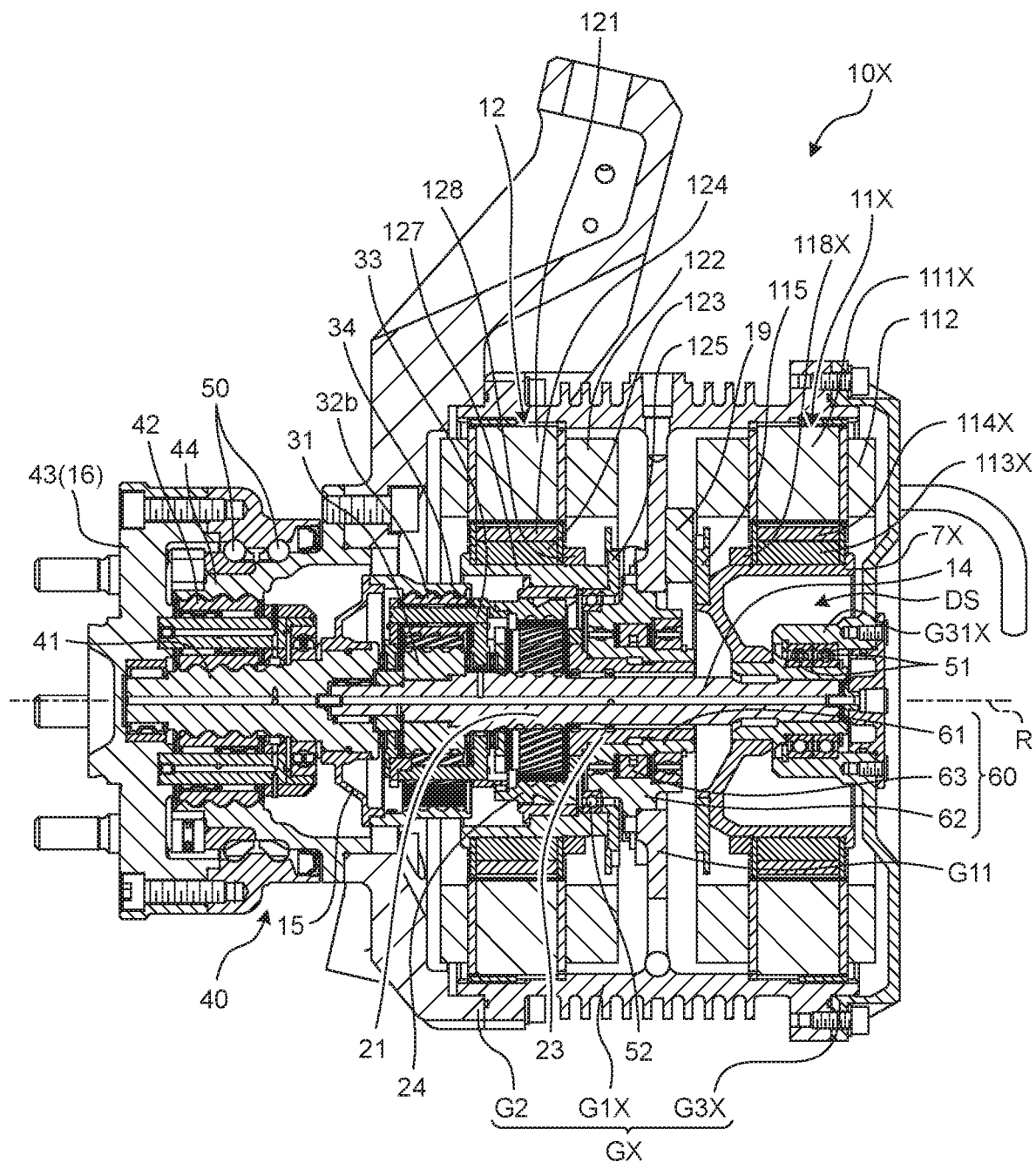
FIG. 10 is a cross-sectional view taken along the line B-B in FIG. 9.
Figure 11:
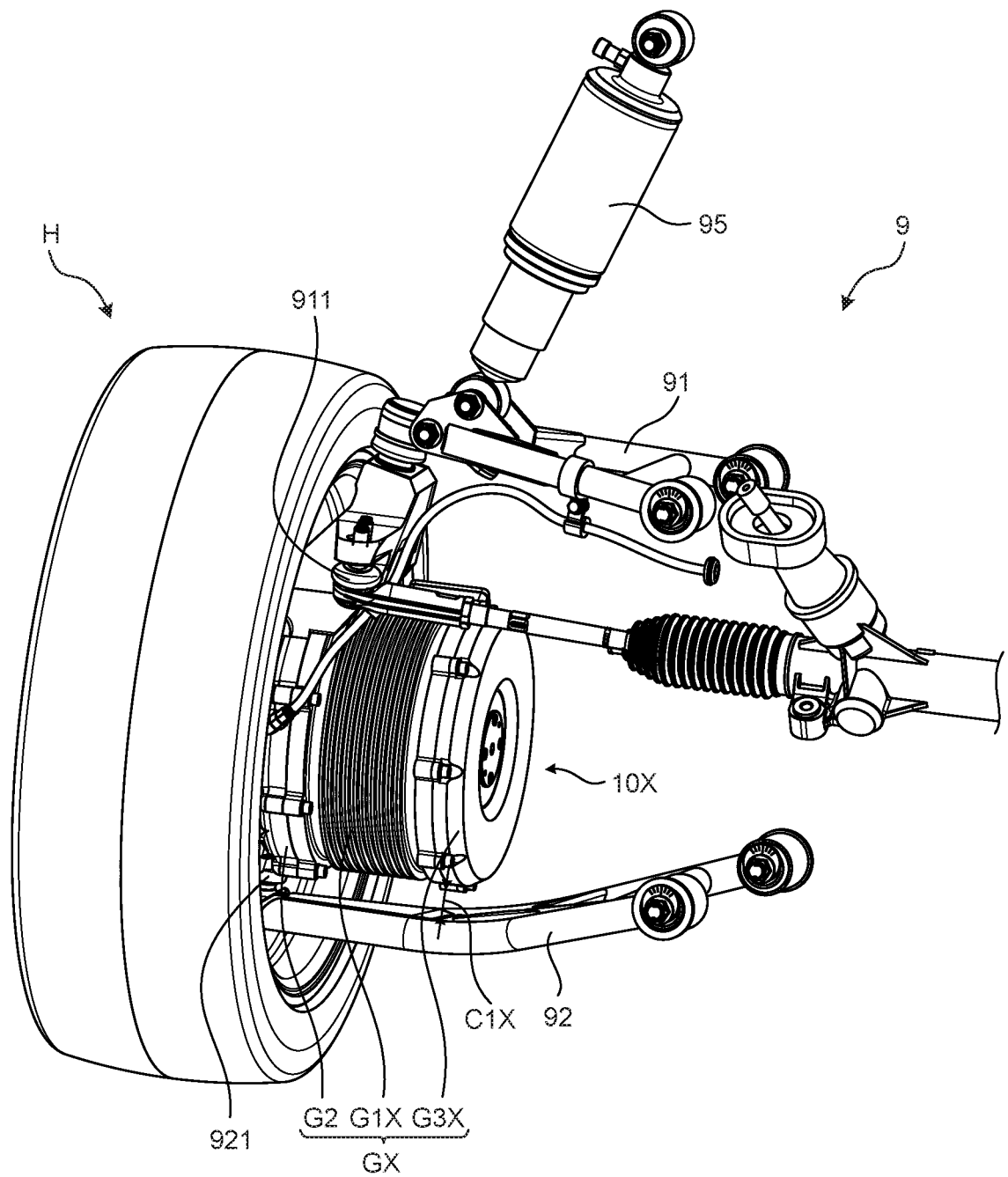
FIG. 11 is a perspective view illustrating the vicinity of a suspension of a vehicle using the electric vehicle drive device according to the comparative example.

FIG. 9 is a front view of an electric vehicle drive device according to a comparative example. FIG. 10 is a cross-sectional view taken along the line B-B in FIG. 9. FIG. 11 is a perspective view illustrating the vicinity of a suspension of a vehicle using the electric vehicle drive device according to the comparative example. In an electric vehicle drive device 10X according to the comparative example, as illustrated in FIG. 10, a first motor 11X is an inner rotor motor. A case GX according to the comparative example includes a case G1X having a shape different from that of the above-mentioned case G1 and a case G3X having a shape different from that of the above-mentioned case G3.

As illustrated in FIG. 10, in the first motor 11X, a first stator core 111X is fixed to an inner peripheral surface of the case G1X. A first rotor core 113X is disposed on the radially inner side of the first stator core 111X. The first rotor core 113X is fixed to a first rotor holding member 7X. The first rotor holding member 7X is supported by a first motor holding unit G31X of the case G3X through a bearing 51, and is coupled to the sun gear shaft 14. The first rotor core 113X is positioned in the axial direction by a first positioning ring 118X attached to the first rotor holding member 7X. A plurality of first magnets 114X are provided on the outer peripheral surface of the first rotor core 113X.

The first motor 11X is an inner rotor motor, and hence as illustrated in FIG. 10, a dead space DS is created between the outer peripheral surface of the first motor holding unit G31X and the first rotor holding member 7X. As a result, the outer diameter of the case G3X increases, and a gap C1X between the case G3X and the lower arm 92 illustrated in FIG. 11 reduces. Thus, the stroke of the shock absorber 95 cannot be sufficiently increased in some cases. Furthermore, the maximum turning angle of the wheel H cannot be sufficiently increased in some cases.

In the electric vehicle drive device 10 according to the present embodiment, on the other hand, the first motor 11 is an outer rotor motor, and hence a dead space is less likely to occur in the first motor 11. Thus, the outer diameter of the case G3 is smaller than the outer diameter of the case G3X according to the comparative example. As a result, the gap C1 illustrated in FIG. 8 is larger than the gap C1X illustrated in FIG. 11. Consequently, in the present embodiment, the stroke of the shock absorber 95 can be increased to be larger than that in the comparative example. The maximum turning angle of the wheel H can be increased compared with the comparative example. Consequently, the electric vehicle drive device 10 according to the present embodiment can improve the traveling performance of the vehicle.

In the first rotor holding member 7, the first outer member 71 and the first inner member 72 are not necessarily required to be separate members, and may be integrally formed. The shape of the first rotor holding member 7 is not limited to the above-mentioned shape. It is sufficient that at least one end of the first rotor holding member 7 be located radially outward of the first stator core 111 and the other end thereof be located radially inward of the first stator core 111 (on the sun gear shaft 14 side).

The suspension 9 of the vehicle to which the electric vehicle drive device 10 is applied is not necessarily required to be a double wishbone suspension. The type of the suspension 9 is not particularly limited, and may be another type such as a torsion beam suspension and a multi-link suspension.

As described above, the electric vehicle drive device 10 includes: the first motor 11, the second motor 12, and the transmission mechanism 13 coupled to the first motor 11 and the second motor 12 and capable of switching a reduction ratio. The transmission mechanism 13 includes the sun gear shaft 14 coupled to the first motor 11. The first motor 11 includes the first stator core 111, the first rotor core 113 disposed radially outward of the first stator core 111, and the first rotor holding member 7 that couples the first rotor core 113 and the sun gear shaft 14.

Consequently, the electric vehicle drive device 10 can change speed by including the first motor 11, the second motor 12, and the transmission mechanism 13. Then, the first rotor core 113 that rotates together with the sun gear shaft 14 is disposed radially outward of the first stator core 111, and hence a dead space is less likely to occur in the first motor 11. Thus, the outer diameter of the case G3 covering the first motor 11 is reduced. Accordingly, the electric vehicle drive device 10 can change speed and reduce the outer diameter of the case G3.

The electric vehicle drive device 10 includes the case G that supports the first motor 11, the second motor 12, and the transmission mechanism 13. The case G (case G3) includes the first motor holding unit G31 having a cylindrical shape coaxial with the sun gear shaft 14. The first stator core 111 is attached to the outer peripheral surface of the first motor holding unit G31. The first rotor holding member 7 is attached to the inner peripheral surface of the first motor holding unit G31 through the bearing 51.

Consequently, as seen from the axial direction, the center of the first stator core 111 and the rotation center of the first rotor holding member 7 are easily aligned. Thus, the centering of the first stator core 111 and the first rotor core 113 can be easily achieved.

The electric vehicle drive device 10 includes the case that supports the first motor 11, the second motor 12, and the transmission mechanism 13. The case G includes the first motor holding unit G31 having a cylindrical shape protruding from the surface opposed to the end surface of the first motor 11. The case G covers a part of the side surface of the first motor 11 and the end surface of the first motor 11.

In the electric vehicle drive device 10, the first stator core 111 is a cylindrical member, and is attached to the outer peripheral surface of the first motor holding unit G31.

In the electric vehicle drive device 10, the case G is a cylindrical member, and includes the partition wall G11 having an annular shape protruding from the inner wall.

In the electric vehicle drive device 10, the first rotor core 113 is positioned in the axial direction by the first positioning ring 118 attached to the first rotor holding member 7.

In the electric vehicle drive device 10, the first rotor holding member 7 includes the first outer member 71 and the first inner member 72 located radially inward of the first outer member 71.

The electric vehicle drive device 10 includes the case that supports the first motor 11, the second motor 12, and the transmission mechanism 13. The first outer member 71 includes the outer tube portion 711, the inner tube portion 712, the coupling portion 713, and the rib 714. The outer tube portion 711, the inner tube portion 712, the coupling portion 713, and the rib 714 are integrated. The outer tube portion 711 is a cylindrical member. The inner peripheral surface of the outer tube portion 711 is in contact with the outer peripheral surface of the first rotor core 113. The outer peripheral surface of the outer tube portion 711 is opposed to the inner peripheral surface of the case G. The inner tube portion 712 is a cylindrical member disposed radially inward of the outer tube portion 711, and is in contact with the first inner member 72. The coupling portion 713 couples one end of the outer tube portion 711 and one end of the inner tube portion 712. The radially outer end portion of the coupling portion 713 is located radially outward of the first stator core 111. The radially inner end portion of the coupling portion 713 is located radially inward of the first stator core 111. The outer tube portion 711 is located radially outward of the first stator core 111. The inner tube portion 712 is located radially inward of the first stator core 111. The rib 714 is an annular member protruding from the coupling portion 713 in the axial direction.

In the electric vehicle drive device 10, the protrusion provided on one of the inner peripheral surface of the outer tube portion 711 and the outer peripheral surface of the first rotor core 113 is fitted into the recess provided in the other of the inner peripheral surface of the outer tube portion 711 and the outer peripheral surface of the first rotor core 113.

In the electric vehicle drive device 10, the outer tube portion 711 and the first rotor core 113 are coupled by spigot joint.

In the electric vehicle drive device 10, the first rotor core 113 is positioned in the axial direction by the first positioning ring 118 attached to the first rotor holding member 7. The outer tube portion 711 includes the recess 715 that is a groove into which the first positioning ring 118 is fitted.

In the electric vehicle drive device 10, the first inner member 72 is fixed to the inner tube portion 712, and includes the small tube portion 721, the large tube portion 722, and the flange 723. The small tube portion 721, the large tube portion 722, and the flange 723 are integrated. The small tube portion 721 is a cylindrical member, and includes the spline 7211 in the inner peripheral surface thereof. The spline 7211 is fitted into the spline provided at the end portion of the sun gear shaft 14. The large tube portion 722 is a cylindrical member, and is in contact with the inner peripheral surface of the first outer member 71. The flange 723 is an annular member protruding from the outer peripheral surface of the large tube portion 722 in the radial direction, and positions the first outer member 71.

In the electric vehicle drive device 10, the first motor 11 includes the first magnets 114 provided on the inner peripheral surface of the first rotor core 113. The first magnets 114 are opposed to the first stator core 111 with a gap therebetween.

The electric vehicle drive device 10 includes: the case G that supports the first motor 11, the second motor 12, and the transmission mechanism 13; and the first rotation angle detector 19 fixed to the case G. The first motor 11 includes the first member to be detected 115 for detecting a rotation angle of the first rotor core 113. The first member to be detected 115 is configured to rotate together with the first rotor holding member 7, and is opposed to the first rotation angle detector 19. The first rotation angle detector 19 detects magnetic flux of the first member to be detected 115 to calculate the rotation angle of the first rotor core 113.

In the electric vehicle drive device 10, the transmission mechanism 13 includes the first sun gear 21 configured to rotate together with the sun gear shaft 14, the first pinion gear 22 engaged with the first sun gear 21, and the first ring gear 24 engaged with the first pinion gear 22 and coupled to the second motor 12.

REFERENCE SIGNS LIST 1 control device
10 electric vehicle drive device
11 first motor
111 first stator core
112 first coil
113 first rotor core
114 first magnet
115 first member to be detected
118 first positioning ring
12 second motor
121 second stator core
122 second coil
123 second rotor core
124 second magnet
125 second member to be detected
127 second rotor holding member
128 second positioning ring
13 transmission mechanism
14 sun gear shaft
15 transmission mechanism input/output shaft
16 wheel input/output shaft
19 first rotation angle detector
20 first planetary gear mechanism
21 first sun gear
22 first pinion gear
23 first carrier
24 first ring gear
30 second planetary gear mechanism
31 second sun gear
32a second pinion gear
32b third pinion gear
33 second carrier
34 second ring gear
40 reducing mechanism
41 third sun gear
42 fourth pinion gear
43 third carrier
44 third ring gear
60 clutch device
61 inner race
62 outer race
63 roller
7 first rotor holding member
71 first outer member
711 outer tube portion
712 inner tube portion
713 coupling portion
714 rib
715 recess
72 first inner member
721 small tube portion
722 large tube portion
723 flange
9 suspension
91 upper arm
911, 921 ball joint
92 lower arm
95 shock absorber G, G1, G2, G3 case
G11 partition wall
G31 first motor holding unit
H wheel

The invention claimed is:

1. An electric vehicle drive device, comprising:
a first motor;
a second motor;
a transmission mechanism coupled to the first motor and the second motor and capable of switching a reduction ratio; and
a case that supports the first motor, the second motor, and the transmission mechanism, wherein
the transmission mechanism includes:
 a sun gear shaft coupled to the first motor;
 a first sun gear configured to rotate together with the sun gear shaft;
 a first pinion gear engaged with the first sun gear; and
 a first ring gear engaged with the first pinion gear and coupled to the second motor, and
the first motor includes:
 a first stator core;
 a first rotor core disposed radially outward of the first stator core; and
 a first rotor holding member that couples the first rotor core and the sun gear shaft,
the case includes a first motor holding unit having a cylindrical shape coaxial with the sun gear shaft,
the first stator core is attached to an outer peripheral surface of the first motor holding unit, and
the first rotor holding member is attached to an inner peripheral surface of the first motor holding unit through a bearing.

2. The electric vehicle drive device according to claim 1, wherein
the first motor holding unit has a cylindrical shape protruding from a surface opposed to an end surface of the first motor, and
the case covers a part of a side surface of the first motor and the end surface of the first motor.

3. The electric vehicle drive device according to claim 2, wherein the first stator core is a cylindrical member, and is attached to an outer peripheral surface of the first motor holding unit.

4. The electric vehicle drive device according to claim 1, wherein the case is a cylindrical member, and includes a partition wall having an annular shape protruding from an inner wall.

5. The electric vehicle drive device according to claim 1, wherein the first rotor core is positioned in an axial direction by a first positioning ring attached to the first rotor holding member.

6. The electric vehicle drive device according to claim 1, wherein the first rotor holding member includes a first outer member and a first inner member located radially inward of the first outer member.

7. The electric vehicle drive device according to claim 6, wherein
the first outer member includes an outer tube portion, an inner tube portion, a coupling portion, and a rib,
the outer tube portion, the inner tube portion, the coupling portion, and the rib are integrated,
the outer tube portion is a cylindrical member,
an inner peripheral surface of the outer tube portion is in contact with an outer peripheral surface of the first rotor core,
an outer peripheral surface of the outer tube portion is opposed to an inner peripheral surface of the case,
the inner tube portion is a cylindrical member disposed radially inward of the outer tube portion, and is in contact with the first inner member,
the coupling portion couples one end of the outer tube portion and one end of the inner tube portion,
a radially outer end portion of the coupling portion is located radially outward of the first stator core,
a radially inner end portion of the coupling portion is located radially inward of the first stator core,
the outer tube portion is located radially outward of the first stator core,
the inner tube portion is located radially inward of the first stator core, and
the rib is an annular member protruding from the coupling portion in an axial direction.

8. The electric vehicle drive device according to claim 7, wherein a protrusion provided on one of the inner peripheral surface of the outer tube portion and the outer peripheral surface of the first rotor core is fitted into a recess provided in another of the inner peripheral surface of the outer tube portion and the outer peripheral surface of the first rotor core.

9. The electric vehicle drive device according to claim 7, wherein the outer tube portion and the first rotor core are coupled by spigot joint.

10. The electric vehicle drive device according to claim 7, wherein
the first rotor core is positioned in the axial direction by a first positioning ring attached to the first rotor holding member, and
the outer tube portion includes a recess that is a groove into which the first positioning ring is fitted.

11. The electric vehicle drive device according to claim 7, wherein
the first inner member is fixed to the inner tube portion, and includes a small tube portion, a large tube portion, and a flange,
the small tube portion, the large tube portion, and the flange are integrated,
the small tube portion is a cylindrical member, and includes a spline in an inner peripheral surface thereof,
the spline is fitted into a spline provided at an end portion of the sun gear shaft,
the large tube portion is a cylindrical member, and is in contact with an inner peripheral surface of the first outer member, and
the flange is an annular member protruding from an outer peripheral surface of the large tube portion in a radial direction, and positions the first outer member.

12. The electric vehicle drive device according to claim 1, wherein
the first motor includes a plurality of first magnets provided on an inner peripheral surface of the first rotor core, and
the first magnets are opposed to the first stator core with a gap therebetween.

13. An electric vehicle drive device, comprising:
a first motor;
a second motor;
a transmission mechanism coupled to the first motor and the second motor and capable of switching a reduction ratio;
a case that supports the first motor, the second motor, and the transmission mechanism; and
a first rotation angle detector fixed to the case, wherein the transmission mechanism includes:
  a sun gear shaft coupled to the first motor;
  a first sun gear configured to rotate together with the sun gear shaft
  a first pinion gear engaged with the first sun gear; and
  a first ring gear engaged with the first pinion gear and coupled to the second motor, and
the first motor includes:
  a first stator core;
  a first rotor core disposed radially outward of the first stator core;
  a first rotor holding member that couples the first rotor core and the sun gear shaft; and
  a first member to be detected for detecting a rotation angle of the first rotor core,
the first member to be detected is configured to rotate together with the first rotor holding member and is opposed to the first rotation angle detector, and
the first rotation angle detector detects magnetic flux of the first member to be detected to calculate the rotation angle of the first rotor core.

\* \* \* \* \*